April 1, 1969     W. R. SAKS     3,436,442
PROCESS AND APPARATUS FOR MANUFACTURING FLOCKED FABRIC
Filed Oct. 12, 1965
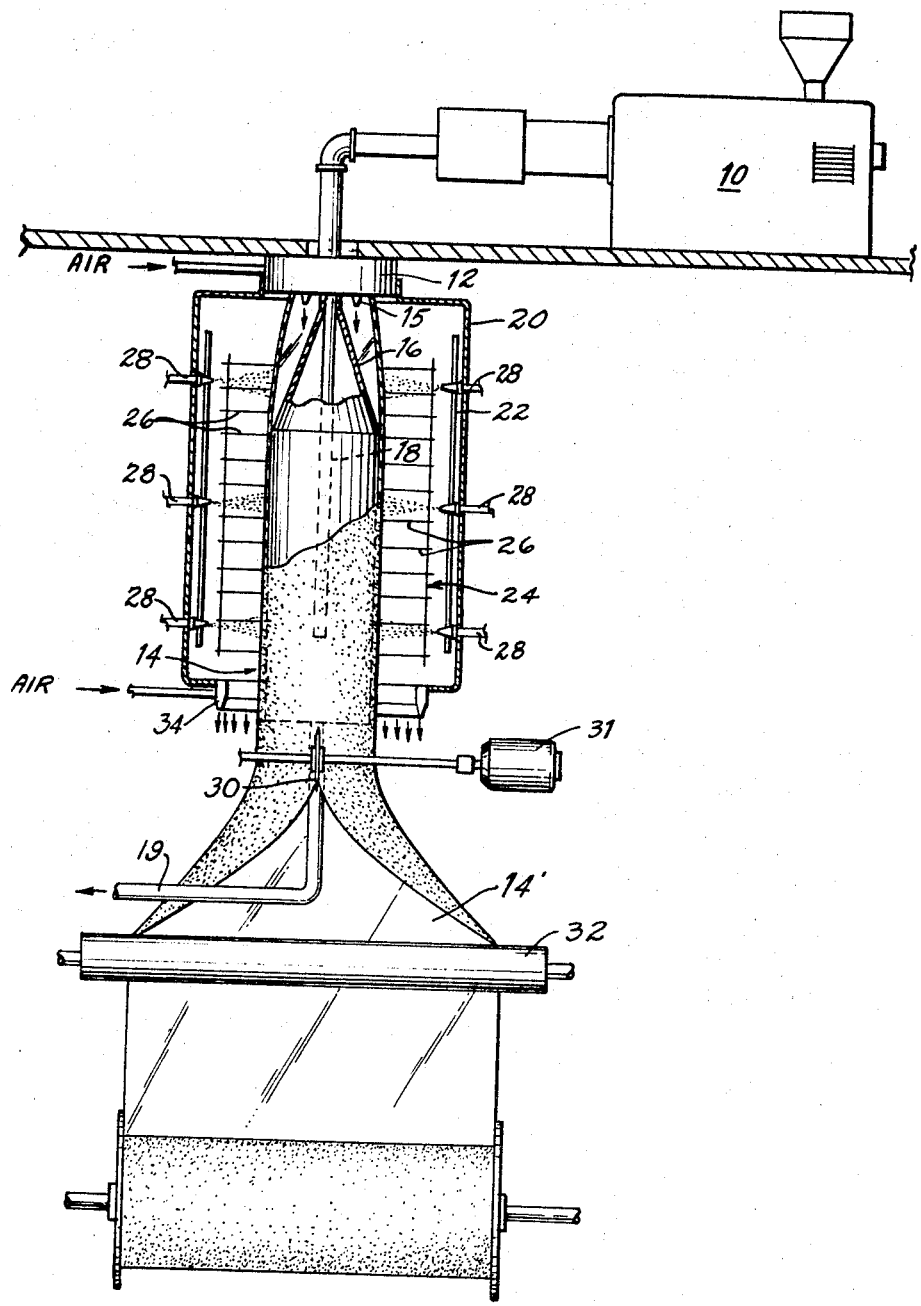
INVENTOR.
WALTER R. SAKS
BY
*Darby & Darby*
ATTORNEYS

United States Patent Office 3,436,442
Patented Apr. 1, 1969

3,436,442
PROCESS AND APPARATUS FOR MANUFACTURING FLOCKED FABRIC
Walter R. Saks, 77 Clinton St., Malverne, N.Y. 11565
Filed Oct. 12, 1965, Ser. No. 495,217
Int. Cl. B29d 9/08
U.S. Cl. 264—24    7 Claims

ABSTRACT OF THE DISCLOSURE

A process and apparatus for manufacturing flocked fabrics wherein a tubular plastic film is extruded and passed through an electrostatic flocking zone to deposit flock circumferentially about the exterior of the tubular plastic while the exterior surface is still tacky and while the interior surface is being cooled. A circumferential electrostatic flocking field is provided using a first electrode circumferentially enveloping the exterior surface of the film and a second electrode spaced interior of the tubular film. The material is subsequently slit to form a flocked fabric.

---

The present invention relates to apparatus and processes for the manufacture of fabrics. More particularly, the present invention relates to the manufacture of flocked fabrics of the type used, for example, for carpeting, apparel, and home furnishing.

In the following specification and claims, "flocked fabric" refers to a natural or synthetic sheet-like material of any sort having deposited thereon finely divided particles (including powder), threads, fragmentary material, or the like, generally referred to as flock. The flock also may comprise natural or synthetic material varying over wide limits as to length, diameter, uniformity, etc.

Commercially, various techniques have been used to manufacture flocked fabrics. For example, in the manufacture of flocked carpet, a base fabric is generally coated with a prime coat of adhesive to which flock adhesive is subsequently applied. The coated fabric is then flocked in a flock chamber with beater bars, electro-static equipment or both. When the flock adhesive has dried, it is cured or cross-linked, the excess flock removed, and the flocked carpet stored in a roll.

This process and the apparatus used present a number of serious problems. In particular, tensions in the base fabric due to tight or loose selvages, and differential tensions in the yarns and weaving, present handling problems during production causing streaking and shading of the flocked fabric. Such problems also may be caused by uneven coating and differential shrinkage of the fabric (particularly with latex). Moreover, it is difficult to get proper flock deposition and orientation at selvages because of differences of tension and differences of induced electrostatic field from beater bars or electrostatic equipment.

The problems outlined above are serious; moreover, as the width of the manufactured fabric increases, the severity of the problems also increases. This is due in part to the difficulty in obtaining an evenly woven wide base fabric, the problems of torque with beater bars, and the control of a wide electrostatic field.

Accordingly, the main object of the present invention is to provide an improved process for the manufacture of wide flocked fabrics.

Another object of the invention is to provide a process for the manufacture of flocked fabrics wherein the problems outlined above, individually and in combination, are substantially reduced.

Another object of the invention is to provide an apparatus and process for the manufacture of flocked fabric which is generally improved as to quality and uniformity.

Still another object of the invention is to provide a process for the manufacture of flocked fabric which is generally improved and less expensive than prior art processes for the same purpose.

Broadly speaking, the above objects are accomplished by depositing the flock on a suspended film which is not supported by a base fabric (or substratum of any sort), carrier web or the like. In this fashion, the problems of fabric tension are substantially avoided, and the desired uniformity and quality may be achieved using conventional techniques for depositing the flock. Preferably, the unsupported film is obtained by extruding a tubular plastic film, and the flock is deposited electrostatically while the film is sufficiently viscous to suitably hold the flock.

The plastic film may be extruded over a mandrel which is cooled so that the inner surface of the tubular film is capable of supporting the film during the flocking process, while the mandrel serves as one of the electrodes for the electrostatic flocking. After the tubular flocked film is drawn from the mandrel, it is cooled; thereafter, it may be slit and laminated to a substratum or base fabric. Alternatively, the flocked film may be rolled up and thereafter laminated to the base fabric in accordance with conventional techniques. If the film is subsequently laminated to an elastic or stretchable product, the resultant product is a flocked fabric which is novel in that it is water-impervious, soft, drapable and stretchable.

The manner in which the above and other objects of the invention are accomplished is described in detail below with reference to the attached drawing which is a schematic illustration of a preferred embodiment of the invention.

The invention in its most specific aspects is not limited to particular fabrics, flocks, plastics, etc. Depending upon the specifications of the product, the combinations and permutations of presently known materials would approach infinity. Accordingly, prior to giving specific examples, the process, apparatus and article of the invention will be described with reference in general terms to the various materials.

FIGURE 1 is a semi-schematic diagram illustrating the principles of the invention. The plastic which is to comprise the unsupported plastic film on which the flock is deposited, is poured into an extruder 10. Extruder 10 feeds into a conventional tubing die 12 which extrudes the tubular plastic film 14 in a downward direction. In accordance with conventional practice, the film 14 is expanded with air from an annular blower 15 onto a mandrel 16 which is treated with a release coating such as Teflon or silicone. The air from blower 15 serves to cool the interior surface of tubular film 14 and facilitate application of the film to mandrel 16. If desired, air may be blown on the exterior surface of film 14 to suitably control the temperature thereof in accordance with the principles set forth below. Further in accordance with conventional extrusion techniques, a pipe 18 feeds water into the mandrel 16 to cool the mandrel so that it may be used as cooling area as desired. The coolant should be piped out of the mandrel as shown at 19 so that maximum cooling can be achieved and the cooling controlled as desired in accordance with conventional practice.

A cylindrical heating sleeve 20 extends downwardly from the tubing die 12 to enclose the film 14 and mandrel 16. The heating sleeve 20 may contain electrical heating elements 22, or flame jets (not illustrated), or both so that the exterior film surface may be circumferentially heated to a desired temperature at the same time the mandrel is cooling the interior surface of the film 14.

The flock is preferably applied electrostatically, and for this purpose a cylindrical electrode grid 24 surrounds the mandrel 16 and film 14 intermediate the mandrel and sleeve 20. As shown, electrode 24 may consist of a plurality of electrically connected hoops 26. Mandrel 16 may be made of an electrically conductive material to serve as the second electrode so that the field exists between the mandrel and electrode 24.

A plurality of flock guns 28 are supported in the heating sleeve exterior of the electrode 24 and suitably positioned so that the entire outer surface of the film 14 may be exposed to the flock. Such flock guns are conventional and will vary in number (as well as kind) depending upon the particular specfications. At the bottom of the mandrel 24, a cutting edge 30 is positioned so that as the flocked film is drawn thereacross, it is slit longitudinally to appear as a conventional web-like material 14'. Cutting edge 30 may be rotated by a motor 31, and the web 14' may be drawn over a hot drum 32 to remove any arc in the web (if necessary). The web 14' of flock film may be laminated to a natural or synthetic base fabric while it is still warm from the extrusion. Conventional laminating techinques may be used for this purpose. If preferred, the web 14' of flock material may be stored in a roll and subsequently laminated to the base fabric in an unrelated manufacturing step.

The flock film may be laminated to the base fabric by immediate combining with retained heat, flame lamination by melting one or both surfaces, coating one or both surfaces with adhesive, or in any other way.

Flock guns 28 may comprise a gravity fed flock deposition system, spray guns (including electrostatic spray guns), centrifugal force guns or vacuum deposition, or any other flock deposition system including mechanical adhesion by entrapment. The electrostatic field may be either AC or DC and, as in conventional flocking systems, serves to suitably orient the flock fibers transversely or radially of the tubular film surface 14 with the flock partially embedded in the molten plastic. If desired, the flock guns 28 or heating sleeve 20 may serve as a portion or all of an electrode of the electrostatic field.

Depending upon the plastic film 14, the temperature of extrustion, the temperature of the mandrel and the outside heating area, the viscosity of the exterior surface of film 14 may be accurately controlled. By controlling the intensity of the electrostatic field between the mandrel 16 and electrode 24 the force of flock deposition may be controlled and thus the extent to which the flock penetrates or is embedded into the film 14. The deposition of the flock may further be varied by controlling the speed of extrusion and/or the rate of fed of flock.

The flocked tubular film 14 may be cooled by air from an annular blower 34 to suitably cool the fabric, or, conventionally, cooling may be achieved by a liquid bath (not shown) prior to slitting, or by an annular water spray from a blower such as 34.

Although the invention contemplates lamination of the flocked film to any base fabric or substratum, a novel product may be achieved by laminating the film 14' to an elastic or stretchable fabric. Because film 14' has a certain inherent elasticity, the end product is a flocked fabric which is stretchable and impervious to liquid. Such stretchable base fabrics amay be knit (circular or tricot), woven of stretchable yarns, or any other type.

Thus, the invention provides a method and apparatus for manufacturing flock fabric which avoids serious prior art problems due to tension in the base fabric by, in effect, suspending a film of plastic and thereafter depositing the flock on an adhesive surface of the plastic. Preferably, the plastic film is extruded in a tubular form about a mandrel which cools the inner surface of the plastic film and serves as an electrode for an electrostatic flocking field. The temperature control is important but will vary depending upon the particular plastics involved and the thickness of the film. By way of example, the film should have a thickness of at least thre mils with the flock embedded to a minimum depth of from one to two mils. In the case of carpeting, the film thickness may be about ten mils.

Although the invention contemplates all temperature ranges and any thickness film, as to the specifically illustrated embodiment, involving downward extrusion, these parameters should be properly adjusted so that the outer surface of the film is sufficiently molten during the flocking process to receive the flock to the desired depth, while the inner surface is cooled sufficiently to have the requisite tensile strength to carry the load of the film, a value which also will vary greatly depending upon the specific production techniques and plastics involved. If desired, take-up rollers may be provided to assist the extrusion process.

The invention also contemplates upward extrusion which is a conventional practice. However, downward extrusion is preferred because the force of gravity can be used to advantage during the flocking process (excess flocking will fall away from the film leaving the die) and if it is necessary to add additional heat, such heat will rise and keep the extrusion, heating, and flocking areas more evenly heated than in the case of an upward extrusion. Moreover, the mandrel can be made longer and the heating and flocking areas larger.

Although certain features of the invention are equally applicable to flat extrusion, circular extrusion is particularly desirable because it will enable the manufacture of much wider flocked fabrics than previously possible. This would be a particular advantage in the manufacture of carpeting wherein a plastic tube with a diameter of less than 60 inches may be subsequently slit to a web 180 inches wide. Thus, if the film were to be ten mils thick, and the plastic fed at a rate of four yards per minute, the slitting surface 30 may be located about twelve feet from the opening of the die 12 allowing sixty seconds to heat the surface of the film to the proper flocking viscosity or melt; cool the inner surface of the tubular film so that it will be strong enough to hold the twelve feet of extrusion and the one to two pounds of flock per square yard, which will weigh in the vicinity of thirty-two to fifty-two pounds (also supported to some extent on the mandrel); deposit the flock; and then cool the flocked film to permit slitting.

The stresses and strains in the soft extruded tubular film due to the hot and cold surfaces generally will not be important, particularly after the film is laminated to the base fabric. If the stresses present problems they can be annealed and removed or reduced during the lamination process.

Furthermore, although the slit film is preferably laminated to a base fabric, the flocked film itself is of attractive appearance, and alone will have utility in many applications, e.g., shower curtains and the like.

Without limiting the invention in any respect, the following representative materials are given prior to setting forth a few specific examples.

The strength of the plastic film will depend upon the end product specification. For example, the inexpensive plastic resins may be used for carpeting while in the case of apparel, materials should be chosen which are dry cleanable, washable, and have desirable properties of soft hand, cold temperature flex, etc. (for example). The following are representative:

PLASTICS

Polyolefins (polyethylene, linear polyethylene, propylenes, polybutene, sulfonated polyolefins, and blends with butyl rubber, acrylics, etc., for example)

Polystyrenes
ABS
Vinyls
Acrylics
Polyamides (nylon)
Acetals
Polyurethanes
Epoxies
Polyallomers (propylene-ethylene)
Cellulosics
Foams of all kinds.

FLOCKS

Cotton
Rayon
Acetate
Polyamides (nylon)
Polyesters (Dacron)
Polyolefins (polypropylenes)
Urethanes
Acrylics
Glass
Acrylonitriles
Jute
Ramie
Flax, etc.

The techniques for obtaining adhesion will also vary depending upon the material used. For example, adhesion may be obtained by blending monomers, polymers, and copolymers of the same or different plastics to obtain immediate or delayed copolymerization or polymerization during extrusion.

Cross linking or curing may be obtained on an immediate or delayed control basis by additives which cure or cross link by oxidation, aging, moisture, drying, catalysts, normal reaction, liberation of reactive groups, partial decomposition, re-polymerization, and heat. Thus, for example, oxidizing the surface of polyolefins by flame or ozone from the electrostatic field will improve adhesion. Drying oils with metallic dryers may be added to some plastic blends to promote adhesion. Adhesion may be improved by partial decomposition and re-polymerization of urethanes and acrylics. Additives of epoxy-polyamide blends also promotes adhesion. These techniques are well known in the art, as are other equivalent methods, and all are within the scope of the present invention.

Example 1.—Carpet

Flock: 30 denier nylon flock, precision cut one-half inch in length to produce velvet type carpet.
Film—Plastisol composition formulated as follows:

100 parts PVC resin (any good commercial grade)
  25 parts dioctylphthalate (plasticizer)
  40 parts Paraplex G30 (Rohm and Haas)
  10 parts Monoplex S–73 (Rohm and Haas)
  10 parts Paraplex G62 (Rohm and Haas)

Stabilized as needed for extruder fabrication.
Temperature of vinyl melt at the lip of die should be in the range of 320 to 385° F.
Gauge of extruded film is 10 mils.
The extruded flocked vinyl film is laminated after slitting to a base fabric of high density urethane foam by melting the urethane foam surface.

Example 2.—Carpet

Flock: 18 denier Dacron (Du Pont) fibers precision cut .400 of an inch.
Film: Urethane elastomer such as Texin 480 (Mobay Chemical Co.).
Plastic extrusion temperatures at mouth of die between 325 F. and 400 F.
Film thickness: eight mils.
Base fabric: jute woven fabric.
The Texin resins, which are urethane elastomers, have a small number of reactive isocyanate groups capable of reacting with the flock fibers as they are embedded in the molten urethane film forming somewhat of a chemical bond as well as a mechanical bond. Moreover, adhesion is improved by reheating during lamination process and normal aging.

Example 3.—Carpet

Flock: Polypropylene, 25 denier precision cut in two lengths and each length in a different color and blended 50/50.
Cuts: .250 and .500 of an inch, blue and green to make iridescent color blend.
Film: Polypropylene, pigmented blue plasticized with 10% butyl rubber, anti-oxidants as needed.
Plastic extrusion temperature at mouth of die between 525° and 575° F. (to take advantage of low viscosity melt point range of 450–525 F.).
Film thickness: 10 mils.
Base fabric: Osnaburg laminated to foam vinyl.
Adhesion promoted by oxidation of surface of polypropylene by ozone from electrostatic field on surface to be flocked. Fibers made to hot melt to base.

Example 4.—Apparel and home furnishings: stretchable

Flock: 3 denier Du Pont nylon, precision cut .045 of an inch.
Film: Urethane elastomer, such as Estane 5702 made washable and dry-cleanable by further curing with 3% benzoyl peroxide.
Base fabric: 5 ozs. per sq. yd., 40 denier nylon tricot knit.
Extrusion temperature range at lip of die: 325° to 400° F.
Film thickness: three mils.
This product produces a velvet type plush. The plush may be varied with the flock cut to .060 inch for example to be softer and deeper in pile, or may be changed to a 1½ denier cut .040 to be shorter and softer in pile.
Suede effects may also be achieved by cutting any type fibers in fine deniers in random lengths ranging from powder to approximately .040 inch. Skill in blending is the key to good appearing and realistic feeling suedes.
Fur effects may be achieved by combing fine denier fibers in long lengths and blending them together in colors and lengths. For example, using a 6 and 9 denier acrylic fiber cut in a blend of 75%, 6 denier cut .090 inch and 25% cut .250 inch produces a soft fur-like appearance when the long fibers are a silvery color and the shorter fibers are brown. Blending of more than two lengths produces even finer effects.

What is claimed is:
1. A process for manufacturing a flocked fabric, comprising the steps of extruding a tubular plastic film, passing said film through a flocking zone while maintaining the interior surface of said tubular plastic film at a sufficiently low temperature so as to provide a support for said film and maintaining the exterior surface of said plastic film sufficiently tacky to receive and retain flock, depositing flock circumferentially on the exterior tacky surface of said tubular film as it passes through said flocking zone with the flock extending in a generally radial direction from said tubular film, applying a circumferential electrostatic flocking field between the interior and exterior surfaces of said tubular film within said flocking zone with the line of force of said flocking field being generally transverse to the exterior surface of said tubular film, and thereafter slitting the flocked tubular film thus formed to provide a flat sheet of flocked fabric.

2. Apparatus for manufacturing flocked fabrics, comprising a mandrel, means for extruding a tubular film around said mandrel, a plurality of flocking guns circumferentially arrayed around said mandrel for depositing flock on the exterior surface of said extruded film, means for cooling at least a portion of said mandrel to thereby reduce the temperature of the interior surface of said tubular film to provide a support for the film, and means for applying an electrostatic flocking field to said tubular film, said last named means including a first electrode circumferentially enveloping the exterior surface of a portion of said tubular film and a second electrode concentrically arranged with respect to said first electrode and spaced interior of said tubular film.

3. Apparatus according to claim 2, wherein said second electrode comprises at least a portion of said mandrel.

4. Apparatus according to claim 2, wherein said mandrel is hollow, and wherein said cooling means comprises means for conducting a fluid coolant against the interior surface of said mandrel.

5. Apparatus according to claim 4, wherein there is further provided means for conducting a fluid coolant between said mandrel and the interior surface of said tubular film.

6. Apparatus according to claim 2, including means for longitudinally slitting said tubular film after the flock has been deposited thereon.

7. Apparatus according to claim 2, including means for heating the exterior surface of said tubular film, said heating means being circumferentially arrayed with respect thereto.

References Cited

UNITED STATES PATENTS

| | | | |
|---|---|---|---|
| 2,789,075 | 4/1957 | Stahl | 156—279 XR |
| 2,411,724 | 11/1946 | Hill | 264—131 XR |
| 2,784,630 | 3/1957 | Koprow et al. | 161—64 XR |
| 2,848,747 | 8/1958 | Dixon. | |
| 3,172,930 | 3/1965 | Johnson et al. | 117—18 XR |
| 3,264,389 | 8/1966 | Sims | 264—131 |
| 3,275,487 | 9/1966 | Lemelson | 156—72 |

ROBERT F. BURNETT, *Primary Examiner.*

ROGER H. CRISS, *Assistant Examiner.*

U.S. Cl. X.R.

18—14; 117—17, 18; 118—634; 156—279; 161—64; 264—95, 131